United States Patent [19]

Perneski et al.

[11] 3,831,152

[45] Aug. 20, 1974

[54] BUFFER MEMORY EMPLOYING INTERREACTION BETWEEN SHIFT REGISTERS

[75] Inventors: Anthony John Perneski, Martinsville; Robert McKee Smith, Holmdel, both of N.J.

[73] Assignee: Bell Telephone Laboratories, Incorporated, Murray Hill, N.J.

[22] Filed: Sept. 14, 1973

[21] Appl. No.: 397,438

Related U.S. Application Data

[63] Continuation of Ser. No. 89,631, Nov. 16, 1970, abandoned.

[52] U.S. Cl. .......................... 340/172.5, 340/174 TF

[51] Int. Cl. .......................... G06f 1/00, G11c 11/14

[58] Field of Search .................. 340/172.5, 174 TF; 179/18 FF, 18 FG

[56] References Cited

UNITED STATES PATENTS

| | | | |
|---|---|---|---|
| 3,430,001 | 2/1969 | Gianola et al. | 179/18 FF |
| 3,465,299 | 9/1969 | Schellenberg | 340/172.5 |
| 3,530,446 | 9/1970 | Perneski | 340/174 TF |
| 3,544,975 | 12/1970 | Hunter | 340/172.5 |
| 3,576,399 | 4/1971 | Schweitzer | 179/18 FF |
| 3,732,551 | 5/1973 | Homma et al. | 340/174 TF |

*Primary Examiner*—Raulfe B. Zache
*Attorney, Agent, or Firm*—David H. Tannenbaum

[57] ABSTRACT

A buffer memory utilizing a magnetic domain structure is arranged with a magnetically soft overlay defining intersecting shift registers. Magnetic domains circulating in a first shift register represent data bits, such as the past busy-idle status of a telephone in a communications system. Magnetic domains selectively generated in a second shift register represent data bits, such as the present status of a telephone, for synchronous comparison with corresponding data bits in the first shift register. When a mismatch occurs between the corresponding magnetic domains an output signal is provided and the first shift register is updated in accordance with the domain representation contained in the second shift register. Provision is made for selectively inhibiting the updating procedure.

29 Claims, 13 Drawing Figures

INVENTORS A. J. PERNESKI
R. M. SMITH
BY David H. Tannenbaum
ATTORNEY

BUFFER MEMORY EMPLOYING INTERREACTION BETWEEN SHIFT REGISTERS

This application is a continuation of application Ser. No. 89,631 filed Nov. 16, 1970 now abandoned.

BACKGROUND OF THE INVENTION

This invention relates generally to memory arrangements and in particular to the arrangement of a magnetic domain structure as a buffer or scratch pad memory.

DESCRIPTION OF THE PRIOR ART

As computer facilities become more and more sophisticated there is a tendency for their memories to increase in complexity. Thus, it is not surprising to find that each additional function that a computer is called upon to perform adds substantial cost to the machine. This added cost is offset in part by arranging the computer so that the memory is always performing some function. Accordingly, it has become standard practice to separate certain functions from the basic machine and to perform those functions in an antonomous manner and thus buffer the central memory from routine scratch pad type of operations.

Such autonomous scratch pad memories are usually arranged to perform a number of routine and repetitive operations, such as locating certain bits of information previously stored therein or storing other bits therein. Thus, a primary factor in considering a buffer memory arrangement is the initial hardware cost as well as the operation costs.

Another important consideration of buffer memories is that when communication is necessary with the central memory, such as when the buffer memory reports a certain change to the central memory, such communication takes place only at the option of the central memory. Thus, in situations where the central memory is busy processing other data the buffer memory must have the capability of communicating its information at some later time. In addition, the buffer memory should be arranged so that it can be shut down and restarted without a loss of stored data. This is especially important in situations where the scratch pad memory is only active for certain fixed periods, but must compare data received over long intervals.

In the prior art, memories which have been arranged as buffer memories usually have storage capability and thus inherently require some form of address retrieval system. Those autonomous scratch pad memories which do not require address information typically are not equipped with storage capability and thus are arranged to force the central processor to accept updating information randomly and under exclusive control of the buffer memory.

Accordingly, a need exists in the art for an economical memory device capable of receiving information, of comparing in a simple manner the received information with information previously stored therein, and of communicating any change of the compared information to a central memory under control of the central memory.

SUMMARY OF THE INVENTION

In one embodiment of the invention, a buffer memory has been arranged in conjunction with a scanning device in a central processor controlled telephone switching system. The scanning device, which communicates busy-idle status changes of telephone stations to the processor, utilizes a magnetic domain structure arranged with a magnetically soft overlay. The overlay defines a number of intersecting shift register loops. One of the loops, the memory loop, is closed so that magnetic domains propagated therein, which domains represent the past status of each telephone station, circulated past a fixed point in the loop once for each revolution around the loop. Other loops define shift registers or channels which contain magnetic domains as representations of the detected present status of each telephone station. Each present status domain representation is compared synchronously with the corresponding past status domain representation and when a mismatch between the compared domains occurs an output signal is communicated to the processor. In situations when the processor is unable to accept the signal, the past status domain representation in the memory shift register remains unchanged and will continue to periodically signal the processor of a mismatch. However, when the processor accepts the status change signal, the memory shift register is updated in accordance with the domain representation contained in the present status shift register. Other recirculating shift register loops contains domains synchronously coordinated with the domain positions of the memory loop. Information obtained simultaneously from a group of these loops is transmitted to the processor as an identification of the status change signal.

DESCRIPTION OF THE DRAWING

The foregoing objects, features and advantages, as well as others of the invention, will be more fully apparent from the following description of the drawing, in which.

It will be noted that in FIGS. 2 through 12 a systematic designation has been employed to illustrate the movement of domains from position to position and to facilitate a more complete understanding of the embodiment. Thus, a domain which is in a certain position at an arbitrary starting time is shown as a solid circle. As that domain moves from position to position along a defined channel in response to a continuously changing magnetic field, broken circles are used for illustration. The letter associated with a portion, such as letter M in FIG. 2. serves to identify the position and to identify any domain thereat. The number associated with each such letter at a specific position represents the number of that position, counting from the arbitrarily selected starting position. Thus, corresponding numbers between domains in separate channels having coordinated starting positions indicate synchronous positions between the channels. The prime sign, ', is used to denote an alternate position for a domain in the associated time slot. Thus, position S3 is the position in which a domain will be three positions after a starting position S1 if no force, other than the force of the rotating magnetic field, is applied thereto. When the domain encounters some other force, such as the repulsive force of another domain, instead of moving from position S2 to position S3 it moves to the alternate position S3'. The manner in which domains are propagated along a channel will be discussed more fully hereinafter.

INTRODUCTION

Figure 1:
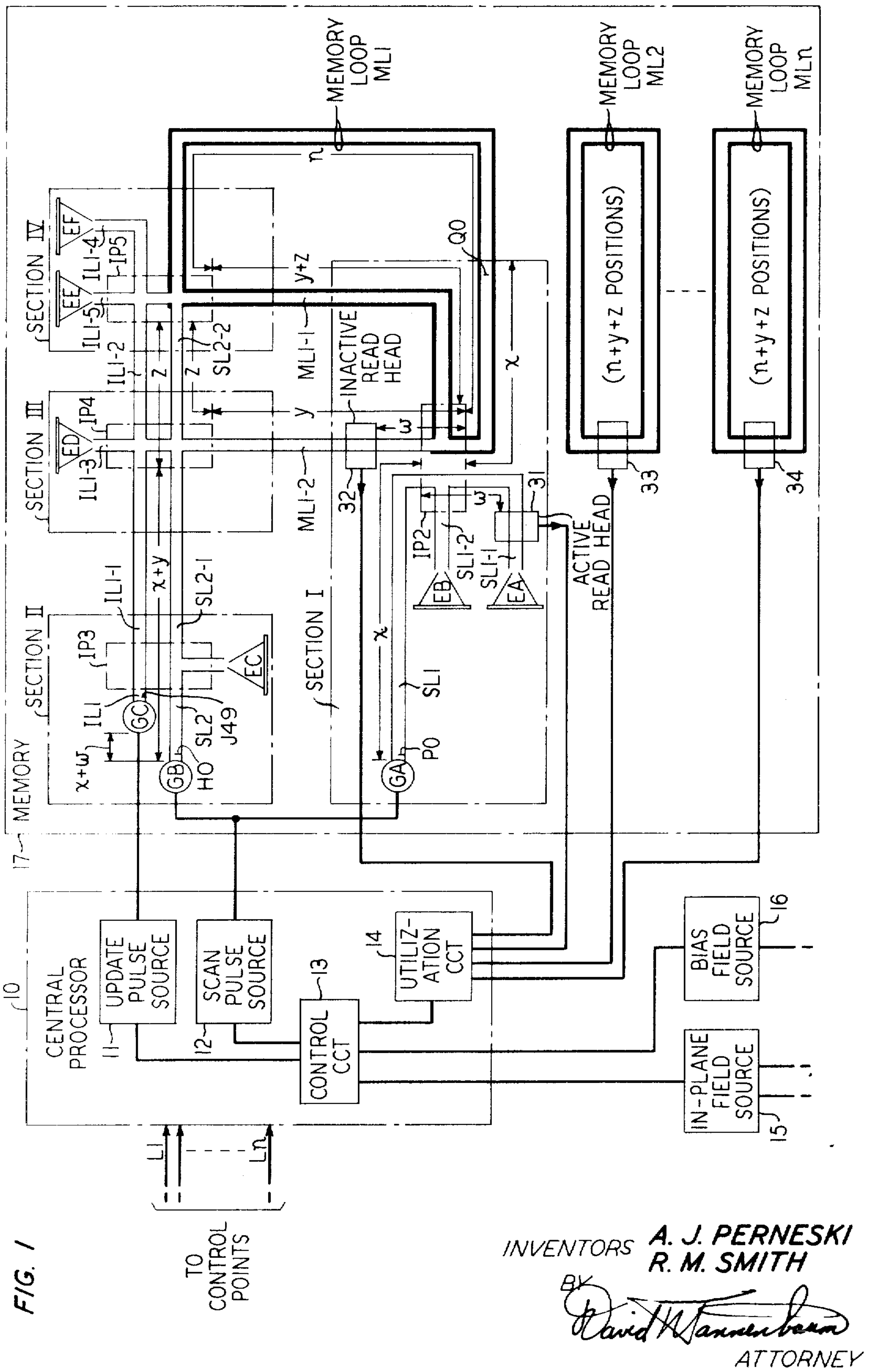
FIG. 1 is essentially a block diagram showing the interrelationship between the components of the exemplary embodiment of the invention.

As shown in FIG. 1, buffer memory 17 is arranged with a number of individual memory loops, such as memory loop ML1, to provide status change signals to central processor 10. The processor 10 is arranged in any well-known manner to control communications between a number of telephone stations (not shown). Control data between the processor 10 and the stations is via data links, such as first station data link L1.

The buffer memory device 17 is a magnetic domain arrangement comprising a slice of material in which magnetic domains are free to circulate in response to a magnetic field such as is generated by in-plane field source 15. Such a structure is fully described in copending application, Ser. No. 732,705 filed May 28, 1968, for A. H. Bobeck, now U.S. Pat. No. 3,534,347 issued Oct. 13, 1970.

A magnetically soft overlay is juxtaposed with the domain propagation slice to provide magnetic points which attract the domains. The magnetic points define the path or channel which is followed by a domain in response to a rotating magnetic field. One such type of overlay, commonly referred to as a T and Bar overlay, is detailed in the above-mentioned copending application of Bobeck. The geometry of the overlay is constructed in such a manner that different points of the overlay become magnetically attractive to the domains during each of the four quadrants of the magnetic field rotation.

Figure 1A:
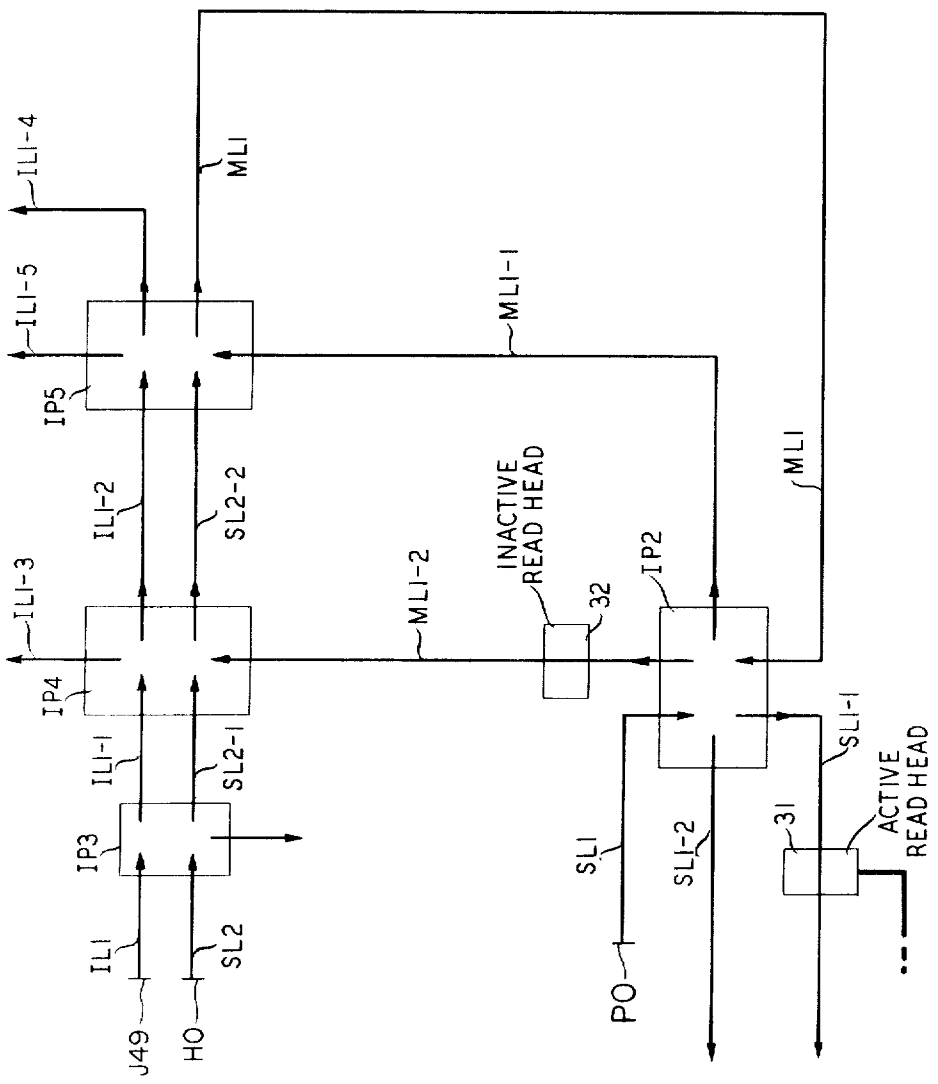
FIG. 1A is a schematic representation of a magnetic domain overlay pattern.

The overlay illustrated in FIG. 1 and partially represented by a line schematic in FIG. 1A contains a number of separate channels or shift registers, such as memory loop ML1 and interrogation channel SL1, constructed such that a domain in any given position in one shift register channel will magnetically interreact with a domain in a certain coordinated position in another shift register channel. Interreaction between domains is utilized to control the device and to provide output and storage capability without external control in the manner to be detailed hereinafter.

An important aspect of magnetic propagation devices is that all of the domains therein are propagated synchronously in response to the same reorienting magnetic field. Thus, the overlay may be constructed in such a manner that domains which are propagated along different paths will arrive at certain points of the overlay in a predetermined coordinated relationship.

This physical control of magnetic domains in spatial coordination coupled with the interreaction forces generated when two domains are in close relationship with each other permit consecutive logic operations to be performed between corresponding representations of different sets of information representations solely within magnetic domain technology if the representations are organized in a form to capitalize on those properties. If, for example, a circuit is to supply a first or a second signal indicative of the status of each of a set of lines, domain patterns representative of the signals last supplied by such a circuit can be organized to interreact directly with a domain pattern representative of update information for those lines to determine the signals next supplied by the circuit. In one sucn operation, a domain shift register operates as a sequential memory for storing domain patterns of control signals last supplied for direct interreaction and thus updating in accordance with domain patterns reflective of changed conditions in the lines.

OBTAINING INTERROGATION INFORMATION

In the embodiment the processor is arranged to scan each data link sequentially thereby obtaining information concerning the present on- or off-hook status of each line at each station. The actual status detecting procedure is well known in the art and in a typical situation a line transformer is pulsed to determine if current is flowing therein. Any other system may be used to generate station status information corresponding to the on- or off-hook condition of each line at each station, including any system where this information is provided to the processor upon request directly from equipment at each station.

Each scan cycle is divided into a number of time slots, each slot associated with a particular line at a particular station. Each station has associated therewith a fixed number of time slots, which number need not be the same for all stations, but may be any number desired. Each line appearing at a station is assigned to one of the time slots and a detected off-hook or busy condition of that line at a given station is represented by a "1", while a detected on-hook condition is represented by a "0" in the corresponding time slot.

One complete scan cycle thus produces a continuous data stream containing 1s and 0s, the length of the stream being equal to the total number of reserved time slots. Accordingly, a 50-station system, each station having ten reserved time slots, will generate a 500-bit data stream once each scan cycle. Comparison of any bit in the stream with the corresponding bit generated during a previous scan cycle will produce an output only when the compared bits are not the same. An organization of this general type is disclosed in U.S. Pat. No. 3,430,001 of U. F. Gianola et al., issued Feb. 25, 1969.

ARRANGEMENT OF MEMORY LOOP

The memory loop ML1, shown in FIG. 1, is constructed so as to contain the same number of domain positions therein as there are time slots in the scan cycle. Thus, each of the memory loops ML1 through MLn are constructed so as to contain 500 consecutive positions through which a domain will be propagated before being recirculated through some fixed position in the loop.

Each of the 500 positions in each loop corresponds to a unique one of the time slots of the scan cycle. The time interval of a total scan cycle is selected to be equal to the propagation timeof a domain around the memory loop and is controlled by the control circuit 13 working in conjunction with the scan pulse source 12 of processor 10. Thus, since a domain which is propagated around the memory loop shift register ML1 moves consecutively from position to position, any domain position may be arbitrarily selected to correspond to the first time slot and the next domain position away from the direction of propagation would then correspond to the second time slot. This direct correspondence is maintained for each memory loop position, and thus each time slot is represented in the memory loop by a domain position.

COMMUNICATING INTERROGATION INFORMATION TO THE MEMORY

One of the memory loops, memory loop ML1, is arranged to compare stored information, one bit at a time, with information currently generated in the scan cycle. The generated bits may be thought of as interrogation data bits for determining the current (previous scan cycle) information stored in the memory. These interrogation bits are represented by domains which are generated and supplied to interrogation shift register SL1 by domain generator GA, which generator is described in copending application, Ser. No. 756,210 filed Aug. 29, 1968, of A. J. Perneski, now U.S. Pat. No. 3,555,527 issued Jan. 12, 1971.

The 500-bit scan cycle output is supplied, one bit at a time, to the domain generator GA such that a magnetic domain representation of the present busy-idle status of each line at each station is obtained. Thus, for example, a 1 in the first time slot generates a domain in a first domain position in the interrogation shift register SL1, while a 0 in the second time slot will allow the shift register SL1 domain position next following to remain empty of a domain.

The domains in the interrogation loop SL1 move synchronously with the domains in the memory loop ML1 since both domains are under the influlence of the same rotating magnetic field source 15 and the same bias source 16. Thus, when a domain in the interrogation shift register SL1 moves through a certain number of positions, a domain in the memory shift register ML1 moves through a corresponding number of positions. The interrogation loop SL1 is constructed to contain $x$ number of positions before the interreaction point IP2 so that a domain, or lack of a domain, associated with the first interrogation position PO corresponds with a domain, or lack of a domain, associated with a position QO in the memory loop $x$ number of positions before the interreaction point IP2 between the two loops. It follows therefore that at some furture time, corresponding to the movement of the domains through $x$ positions, the two domain representations will interreact with each other magnetically to provide output signals controlled by their specific interreaction.

DETAILED DESCRIPTION

Prior to beginning the detailed description a brief discussion of the overall operational features of the embodiment will be given with respect to FIG. 1A. As noted above, FIG. 1A is a schematic representation of the domain overlay showing the domain propagation paths represented by arrows. The direction of each arrow indicates the direction of domain propagation therein.

Domain channel SL1 is the interrogation channel and contains domain representations of the present status of the respective telephone stations. Domain channel ML1 is the memory channel and contains domain representations corresponding to the past status of the telephone stations. Domains in these two channels are coordinated such that when a domain representation corresponding to a certain station is present in channel SL1 at the interreaction point IP2 the domain representation in channel ML1 at that interreaction point also corresponds to that same station.

Memory loop ML1 is constructed with two alternate channels ML1-1 and ML1-2 branching out from the interreaction point IP2. Thus, as will be detailed hereinafter, a magnetic domain representation propagated in the memory channel ML1 will either follow channel ML1-2 and channel SL2-2 before reentering the memory channel ML1 at interreaction point IP5, or will follow channel ML1-1 to reenter memory channel ML1 at that same interreaction point. The total distance between interreaction point IP2 and interreaction point IP5 is the same whether a domain representation follows the first path or the second path.

The preferred path that a domain representation follows if no force other than the rotating magnetic field is applied thereto is along the channel ML1-2. Domains only enter channel ML1-1 when an interreaction occurs between a domain in memory loop ML1 and a domain in interrogation loop SL1 at interreaction point IP2. Such an interreaction implies that a match condition between the present status and past status of the corresponding station is detected and thus no further action is to be taken.

The interreaction between the domains from channels ML1 and SL1 causes both domains to follow the nonpreferred paths of ML1-1 and SL1-2, respectively. Thus both read heads 31 and 32 are bypassed and no signal is sent to the processor.

Domains in channel SL2 are generated in parallel with domains in channel SL1 and are thus coordinated therewith and with domains in channel ML1. The length of the path which consists of channels SL2, SL2-1 and SL2-2 is constructed such that this coordination is maintained at interreaction point IP5 between domain representations in channel SL2-2 and ML1-1. Thus, since a domain will only be present in channel ML1-1 at interreaction point IP5 if that domain interreacted with a domain at interreaction point IP2, a domain will also be present in channel SL2-2 at interreaction point IP5 in coordinated relationship to the domain in channel ML1-1. These domains intersect in such a manner that a domain becomes present in memory loop ML1 in the same position as would have been occupied by the domain propagated in channel ML1-1. Thus the memory loop ML1 still contains the domain representation of the past status of the corresponding station.

Under certain conditions the domain which should be present under the conditions described above in channel SL2-2 has been removed from that channel by a previous interreaction. In this situation, as will be described subsequently, a domain would be present in channel IL1-2 and this domain would also be coordinated with the domain in channel ML1-1. The interreaction point is constructed in such a manner that the domain in channel ML1-1 upon interreaction with the domain in channel IL1-2 enters memory loop ML1 at the proper position.

When a mismatch occurs at interreaction point IP2 as a result of the present status of a telephone station being different from the past status of that station, no interreaction can take place and therefore one of the domains must move past the respective read head. For example, in the event a domain is present in channel SL1 and no domain is present in channel ML1 the domain in channel SL1 moves along channel SL1-1 and past Active Read Head 31. A signal is thereby sent to the processor as an indication that an inactive to active mismatch has occurred. If, on the other hand, a mismatch occurs where a domain is present in channel ML1 that domain continues along channel ML1-2 and past Inactive Read Head 32. Thus the active to inactive condition is reported to the processor.

Under the last-mentioned condition where the memory contains a domain and the present status of the corresponding station is inactive the domain continues along channel ML1-2 to interreaction point IP4. Since channel SL2 is coordinated with channel ML1-2 and with channel SL1 no domain is present at interreaction point IP4 when the mismatched domain in channel ML1-2 is propagated thereto. These two representations pass each other and thus channel SL2-2 contains no representation at the coordinated position. This vacant position is propagated along channel SL2-2 and enters memory loop ML1 at the coordinated location therein. Thus, the memory loop now contains a vacant position where a domain was present prior to interrogation. Accordingly, the memory has been updated in accordance with the information provided thereto by the interrogation channels.

In the situation where it is desired to prevent the memory from being updated domains are generated in channel IL1 in coordination with domains in the memory channel ML1-2 in such a manner that when a domain arrives at interreaction point IP4 in channel ML1-2 representing a mismatch condition that domain is forced to enter channel SL2-2 and thus enter the memory loop ML1 in the same position that it previously occupied. Accordingly, the memory is not updated under control of domains in auxiliary channel IL1-1.

The precise interreaction forces which are present at each of the interreaction points will now be discussed in detail with reference to FIGS. 2 through 12.

INTERREACTION BETWEEN CHANNELS

Figure 2:
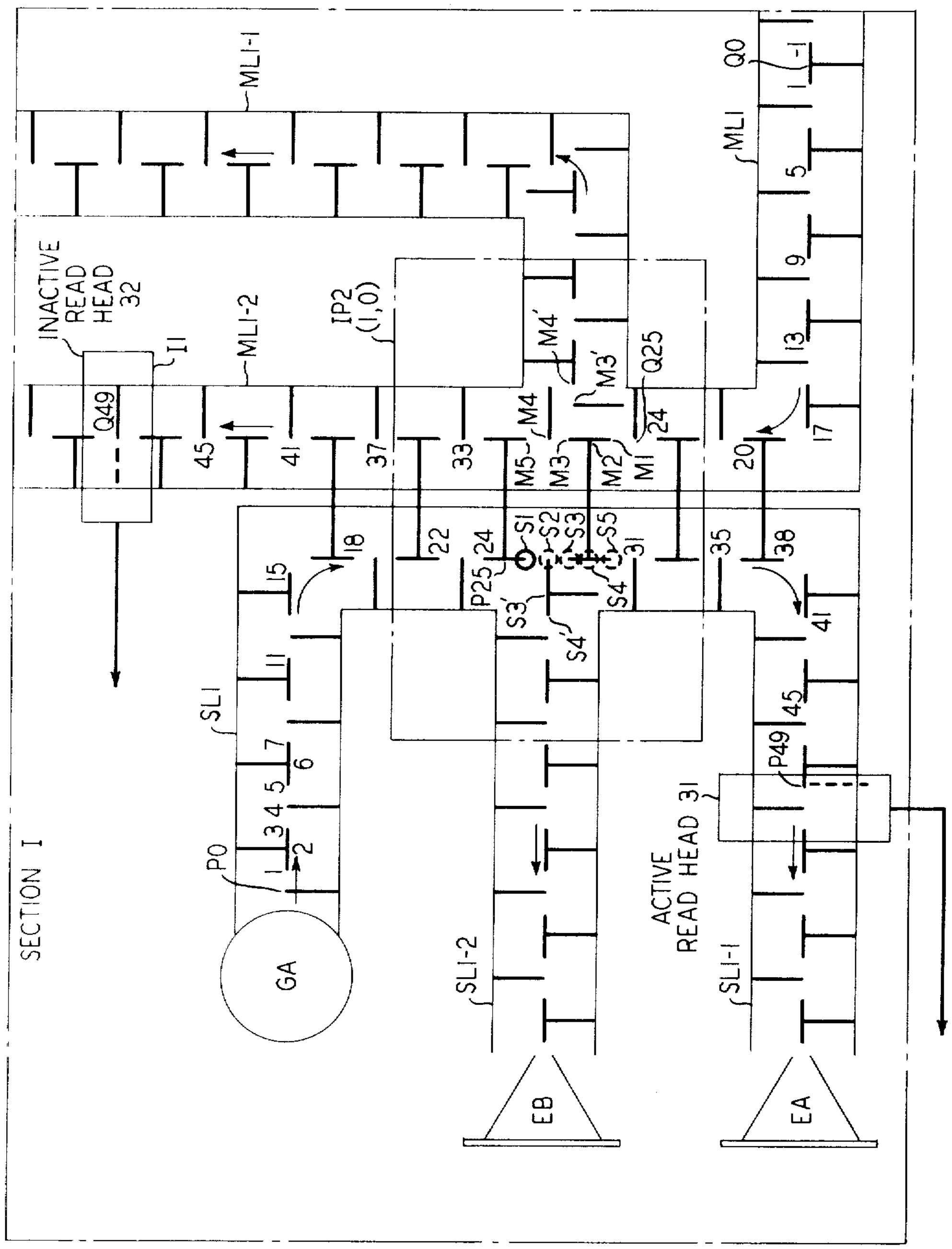
FIGS. 2 through 12 are schematic drawings showing in greater detail the interreaction points between the shift registers.

FIG. 2 shows a portion of the domain propagation device corresponding to Section I of FIG. 1. The interrogation channel SL1 begins with domain generator GA and ends with domain annihilation devices EA and EB associated with respective interrogation channels SL1-1 and SL1-2. The annihilation devices or domain eaters are arranged as detailed in application Ser. No. 795,148 filed Jan. 30, 1969 of R. H. Morrow and A. J. Perneski, now U.s. Pat. No. 3,577,131 issued May 4, 1971, to reduce any domain circulated thereto.

The memory loop ML1, as illustrated in FIG. 2, begins with the portion of the channel shown and branches out into two alternate memory loop paths ML1-1 and ML1-2. Domains in the respective channels propagate in the direction of the arrows in response to a counter clockwise rotating magnetic field.

MISMATCH BETWEEN INTERROGATION AND MEMORY SHIFT REGISTERS (1, 0)

Let us now assume that at an arbitrarily selected time a domain is generated corresponding to a detected off-hook condition of a line associated with the first time slot of the first station to be scanned. Accordingly, a domain, represented as a 1, is placed at position PO of FIG. 2 in the interrogation channel SL1. As illustrated, there are 25 positions between position PO and position P25 in the interrogation loop SL1 and there are 25 positions between positions Q0 and Q25 in the memory loop ML1. Thus, position P25 of channel SL1 is synchronously coordinated with position Q25 of channel ML1.

Remembering that the number of positions in the memory loop has been selected to correspond to the number of time slots of a complete scan cycle, it follows then that the domain, or lack of domain at position Q0 in the memory loop ML1 represents the previous status of the line associated with the time slot now represented by a domain in interrogation channel SL1 position PO. And the domain representation in the next succeeding memory loop position Q1 corresponds to the previous status condition of the line in the time slot to be scanned next in the scan cycle. Thus, it will be noted that the interrogation channel SL1 need not be so large as to contain a representation for every time slot as long as each status representation is sequentially applied thereto in fixed order.

In a typical arrangement, the number of positions in the interrogation channel would be selected so that the domain generation and annihilation devices are physically separated from the interreaction point IP2 and from each other so as to prevent interference therebetween and to allow for electrical connections thereto.

INACTIVE TO ACTIVE CHANGE

Continuing in FIG. 2, assume that a domain is present in position PO of the interrogation channel SL1 corresponding to an active or off-hook condition of the line assigned to the first time slot of the first station. Thus, a 1 is represented at position PO. Assume also that the previously detected status of that same line at that same station was inactive or an on-hook condition. Then position Q0 of the memory loop ML1 would be vacant, representing a 0 thereat.

At the conclusion of the 25th positional movement (6 ¼ field rotations) the representations will be at positions P25 and Q25, respectively. Thus position P25 contains a domain representation and position Q25 is vacant. When the field moves an additional quadrant the interrogation channel SL1 domain moves to position S1 and position M1 in the memory channel ML1 becomes vacant.

It will be noted that S1 and M1 are coordinated positions and correspond to domains moved from positions P25 and Q25, respectively. The change in the positional counting designations is for drawing and descriptive clarity.

At the next quadrant of the field the interrogation domain moves to position S2. Memory channel ML1 position M2 is now vacant. At each successive quadrant the interrogation domain moves along the positions S3, S4, and S5. When the interrogation domain reaches position S5 the memory channel is vacant at position M5. These respective representations continue to be moved one position at a time along their respective channels. Thus the interrogation domain moves along channel SL1-1 while the coordinated vacant position moves along channel ML1-2.

STATUS CHANGE SIGNAL

Continuing in FIG. 2, at the 49-th positional movement after a domain is generated at position PO, corresponding to the off-hook condition detected in the first time slot, the respective domains arrive at positions P49 and Q49 over which positions a read head, such as Active Read Head 31 or Inactive Read Head 32 is associated. These read heads may be Hall-effect detectors as disclosed in application Ser. No. 882,900 filed Dec. 8, 1969 of W. Strauss now U.S. Pat. No. 3,609,720 issued Sept. 28, 1971, and arranged so as to provide a signal whenever a domain is detected at a certain position. Since position Q49 is vacant, no signal is transmitted from Inactive Read Head 32. However, an output signal is transmitted to the utilization circuit 14 of processor 10 from Inactive Read Head 31 due to the presence at position P49 of a domain. This signal is an indication that a station is now off-hook and that the scratch pad memory 17 contains an on-hook representation thereof; i.e., an inactive station going active.

The identity of the station which has changed status is provided to processor 10 at this time from memory loops ML2-MLn, FIG. 1. To be specific, the overlay defining the memory loops ML2-MLn is constructed so as to contain the same number of positions as does memory loop ML1. Utilizing the fact that domains in all loops propagate from position to position at the same rate, domains can be placed into these loops and coordinated with the respective positions of memory loop ML1 such that the binary word formed upon detecting the presence or absence of a domain under a read head at a fixed position in each loop, such as read heads 33—34, yields the station number and the line thereat of the signaling station.

Processor 10 may accept the information supplied by the scratch pad memory 17 or it may ignore that information. If the information is accepted, the memory loop ML1 is updated under control of update pulse source 11 in the manner to be detailed hereinafter so that a domain is inserted into the previously empty memory position corresponding to the now active line. In the event the information is not accepted, such as when the processor is overloaded or not functioning properly, or when the processor is arranged to accept information only after it has been proffered a certain fixed number of times, the memory loop ML1 is not updated and the position corresponding to the currently active line remains vacant.

When the status change information is not accepted and the active line remains active, the processor 10 again receives an off-hook signal during the next scan cycle. The precise manner in which the overlay is constructed so that memory updating and memory update inhibiting is performed will be more fully detailed hereinafter.

Returning now to FIG. 2, after a domain passes Active Read Head 31, it is moved along channel SL1-2 to annihilator EA and reduced. The number of positions between the readout head 31 and the annihilator EA is not critical and is determined by the physical characteristics of the overlay.

MATCH BETWEEN INTERROGATION AND MEMORY SHIFT REGISTERS (1, 1)

Continuing in FIG. 2, again assume that a certain line at a certain station is detected as being off-hook. Accordingly, a domain is generated into position PO of the interrogation shift register SL1 during the time slot associated with that line and station. Also assume that during the same time slot in a previous scan cycle an off-hook condition was detected and the memory updated in accordance therewith. Accordingly, a domain is present in the memory shift register ML1 at position Q0. As detailed above, these domains are propagated along their respective channels one position at a time until at the end of the 25th positional movement domains are present at positions P25 and Q25, respectively.

Figure 3:
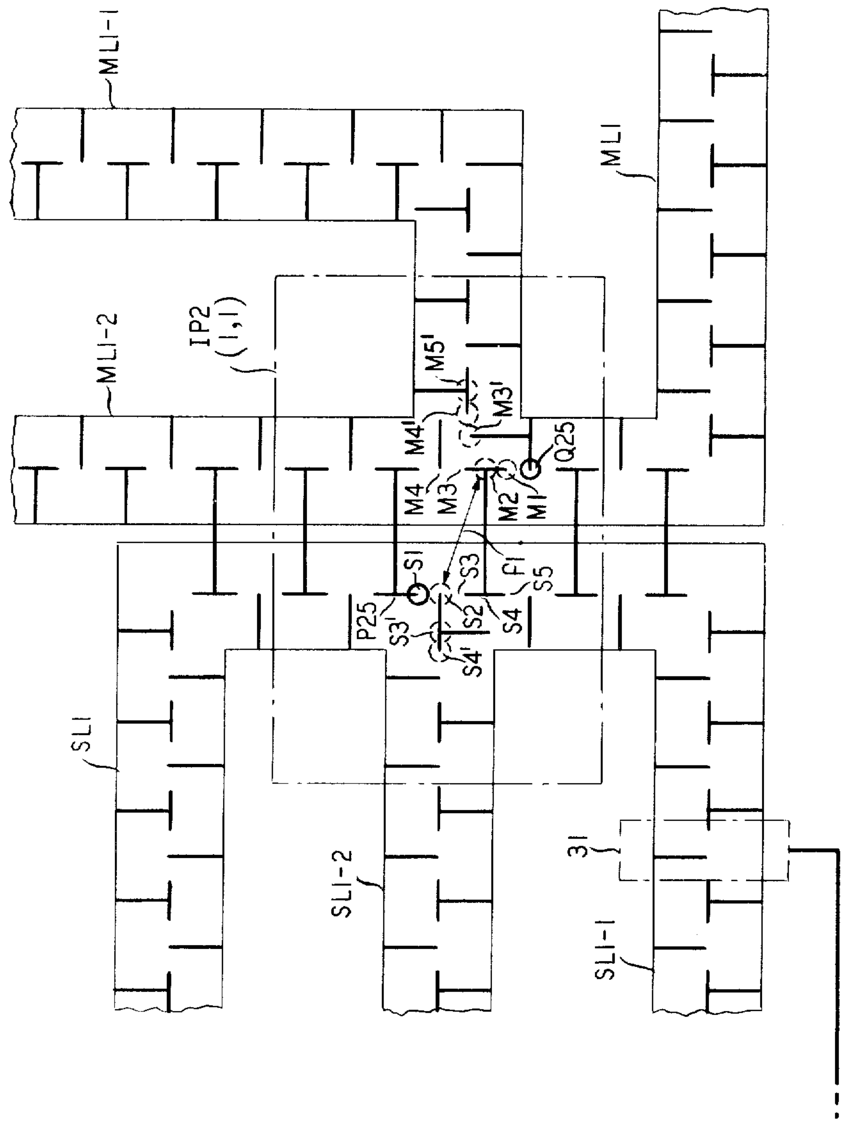

Turning now to FIG. 3, at the next quadrant of the rotating magnetic field domains are located at positions S1 and M1 in the respective shift registers. At the next quadrant the domains move to positions S2 and M2, respectively. When the domains are in this position they are relatively close to each other and exert a mutually repulsive force f1 between them. However, since at this point the overlay pattern is constructed such that neither domain has an alternate position to which it can move, they each remain in their respective positions.

At the next quadrant of the field the interrogation domain attempts to move to position S3, its next preferred position. However, because of the repulsive force f1 the interrogation domain moves instead to an alternate position S3'. Similarly, the memory domain attempts to move to position M3 but instead is repelled to position M3'. At each succeeding quadrant phase the respective domains move along the channels SL1-2 and ML1-1.

Returning again to FIG. 2, it will be seen that channel SL1-2 is a path to annihilator EB and the interrogation domain which was diverted from interreaction point IP2 and channel SL1-1 leading to the Active Read Head 31, will be reduced. Thus, at the conclusion of the 49th positional movement, as counted from position PO, position P49 will be vacant and Active Read Head 31 will not transmit a signal to the processor 10. The memory domain, which was diverted from the interreaction point IP2 and the channel ML1-2 leading to the Inactive Read Head 32, now follows the memory channel ML1-1. The purpose of this diversion, in addition to causing position Q49 to be vacant during the 49th positional movement so as to prevent Active Read Head 31 from transmitting a status change signal to the processor at this time, will become more apparent from that which is contained hereinafter.

Summarizing briefly, when domains in corresponding positions of each of two shift registers, namely, the interrogation SL1 and memory ML1 shift registers, which domains each represent similar status conditions of a line at a station, are propagated through an interreaction point IP2, they are each diverted along separate paths of the overlay so as to bypass the output signaling devices associated with certain fixed positions in each shift register.

MISMATCH BETWEEN INTERROGATION AND MEMORY SHIFT REGISTERS (0, 1)

Continuing in FIG. 2, now assume that a previous active line is now detected to be inactive. Assume also that the memory has been updated in accordance with the previous condition so that the memory now contains a domain in the associated memory position. Accordingly, position PO in shift register SL1 is vacant when the time slot associated with the line and station in question is interrogated. However, a domain is present in position Q0 of shift register ML1 at the corresponding time slot. As detailed above, at the end of the 25th positional movement thereafter position P25 is vacant and position Q25 contains a domain.

Figure 4:
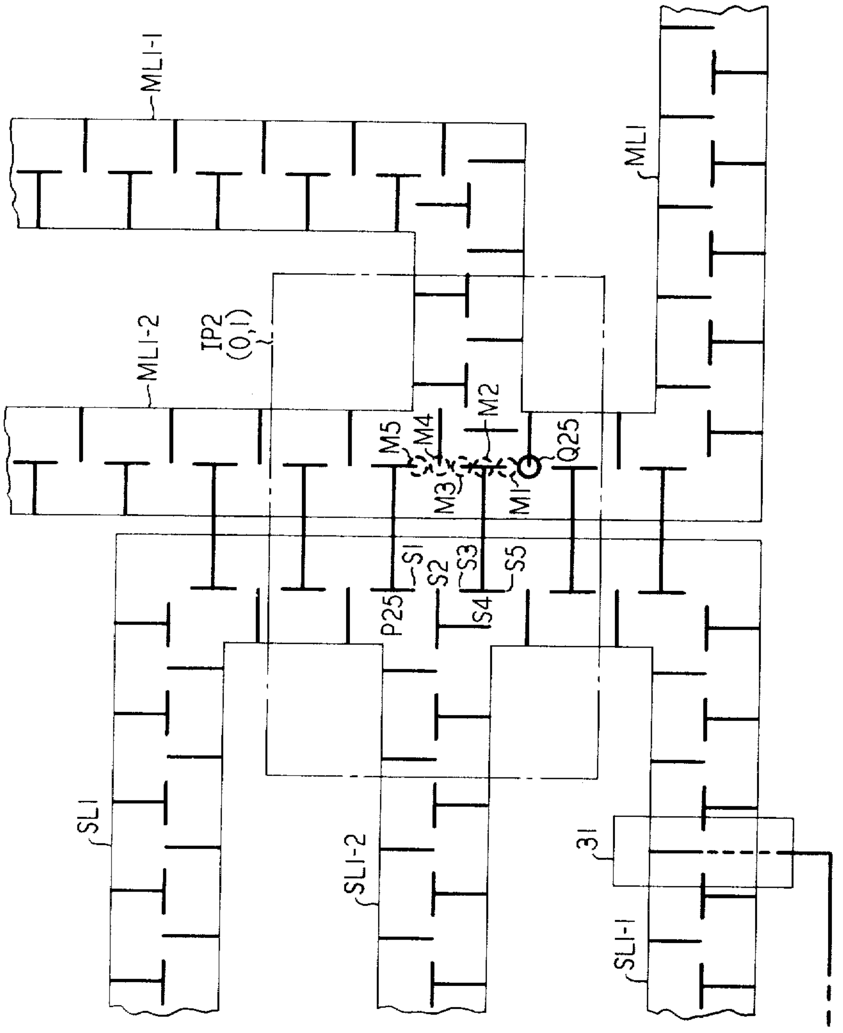

Turning now to FIG. 4, it will be seen that the domain in position Q25 moves without interference through interreaction point IP2, from position M1 to position M5 during the next five quadrants of the rotating magnetic field. Thus, the domain continues to move along the channel ML1-2 during each succeeding quadrant of the magnetic field while the corresponding positions in channels SL1-2 and SL1-1 are vacant.

Returning again to FIG. 2, we see that at the conclusion of the 49th positional movement, as measured from position Q0 in memory loop ML1, position Q49, which position is monitored by Inactive Read Head 32, contains a domain. Accordingly, an output signal is transmitted to the processor 10, FIG. 1, at this time together with the identity, as obtained from the shift register loops ML2-MLn, of the now inactive or on-hook station.

Thus, at this time the processor 10 is signaled that a status change has taken place at a specific station and at a specific line thereat. Again the processor may accept this indication and update the memory in accordance with the new status. Or the processor may ignore the signal, in which case the memory loop is not disturbed. The exact manner in which this memory updating and update inhibiting is accomplished will be more apparent from that which is contained hereinafter.

MEMORY UPDATE AND UPDATE INHIBIT CHANNELS

Figure 5:
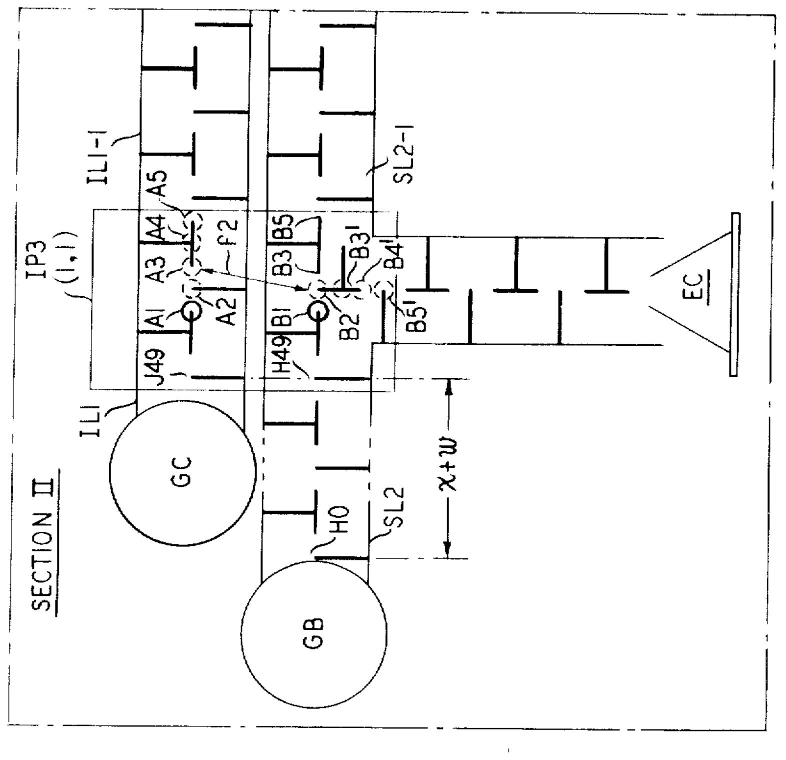

Turning now to FIG. 5, domain generator GB is arranged to generate a domain whenever a domain is generated by domain generator GA, shown in FIG. 2. Thus, the presence or absence of a domain at position HO in shift register SL2 corresponds to the detected busy-idle status of a line at a station in the corresponding time slot. The number of positions between position HO and position H49 of shift register SL2 is carefully constructed to equal the number of positions between position PO of shift register SL1, FIG. 2, and Active Read Head 31, which in the embodiment is 49 positions. Thus, 49 represents the summation of the $x$ and $w$ dimensions as shown in FIG. 1.

Continuing now in FIG. 5, assume that a domain is present at position HO at some arbitrarily selected time representing a busy condition detected during the associated time slot in the scan cycle. Thus, after the 49th positional movement the domain is present at position H49 in shift register SL2. Since this domain is moved synchronously with the domains in shift registers SL1 and ML1 and since the domain at position HO is generated concurrently with a domain in shift register SL1, position PO, both domains reach the 49th position at the same time. It will be recalled however that the domains in shift registers SL1-1 and ML1-2, as shown in FIG. 2, only reach their respective 49th positions if they are mismatched. FIG. 1A may be helpful at this point for reference. Assuming such a condition, then processor 10 is notified of a status change in the manner described previously.

If the processor accepts the information, update pulse source 11, which pulse source has been providing pulses for the generation of domains via domain generator GC, is inhibited and a domain is not generated at the corresponding time in channel IL1. Accordingly, as shown in FIG. 5, the presence or absence of a domain in shift register IL1 at position J49 corresponds to the inhibit or update control, respectively, of the memory loop. For example, a domain in position J49 prevents the memory from being updated while the absence of a domain at position J49 is an update signal to the memory. The precise manner in which the updating or inhibiting occurs will be detailed hereinafter.

Assuming now that a domain is present at position H49 of shift register SL2 and that a domain is also present at position J49 of shift register IL1, these domains will be propagated together so that they appear sometime later at coordinated positions B1 and A1, respectively, of interreaction point IP3. At each succeeding quadrant of the rotating magnetic field the domain in shift register IL1 will move one position down the channel and at the end of four quadrants will appear at position A5. However, because of the interreaction force f2 between the domains, the domain in shift register SL2 moves to position B5′ instead of its normally preferred position B5.

Continued rotation of the magnetic field will move the domain in shift register SL2 down the channel to annihilator EC. Thus, in the condition where the memory is not to be updated, the domain in shift register SL2 is removed therefrom by the domain generated in shift register IL1. Accordingly, for a mismatch condition where the memory is not to be updated, coordinated positions in channel SL2-1 are vacant while the corresponding positions in channel IL1-1 contain domains. The importance of this condition will be seen from that which is contained hereinafter.

Figure 6:
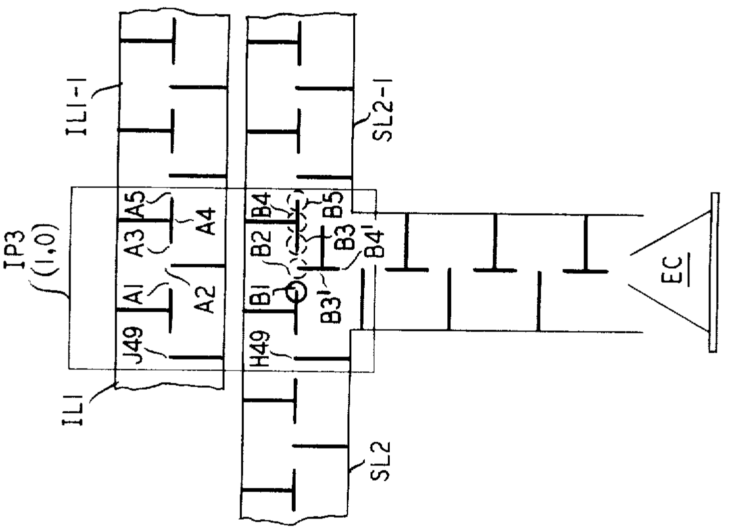

Turning now to FIG. 6, in the situation where a domain is present in shift register SL2 and the processor elects to update the memory, position J49 is vacant. In this situation the domain in shift register SL2 moves through the interreaction point IP3 in the manner shown without interference. Thus for memory updating, channel SL2-1 contains a domain while channel IL1-1 is vacant.

Summarizing briefly, when an off-hook condition is detected a domain is inserted into an auxiliary channel SL2 in a position coordinated with a position in the interrogation channel SL1. In the situation where the memory is to be updated in accordance with the detected condition, the domain representation is allowed to remain in the auxiliary channel. In situations where the memory is to remain unchanged, the domain in the auxiliary channel is removed therefrom by the interreaction of a domain generated under control of the processor. As will become more apparent from that which is contained hereinafter, the updating arrangement functions in this same manner whether a busy or idle status is detected.

MISMATCH CONDITION — MEMORY REMAINS UNCHANGED

Figure 7:
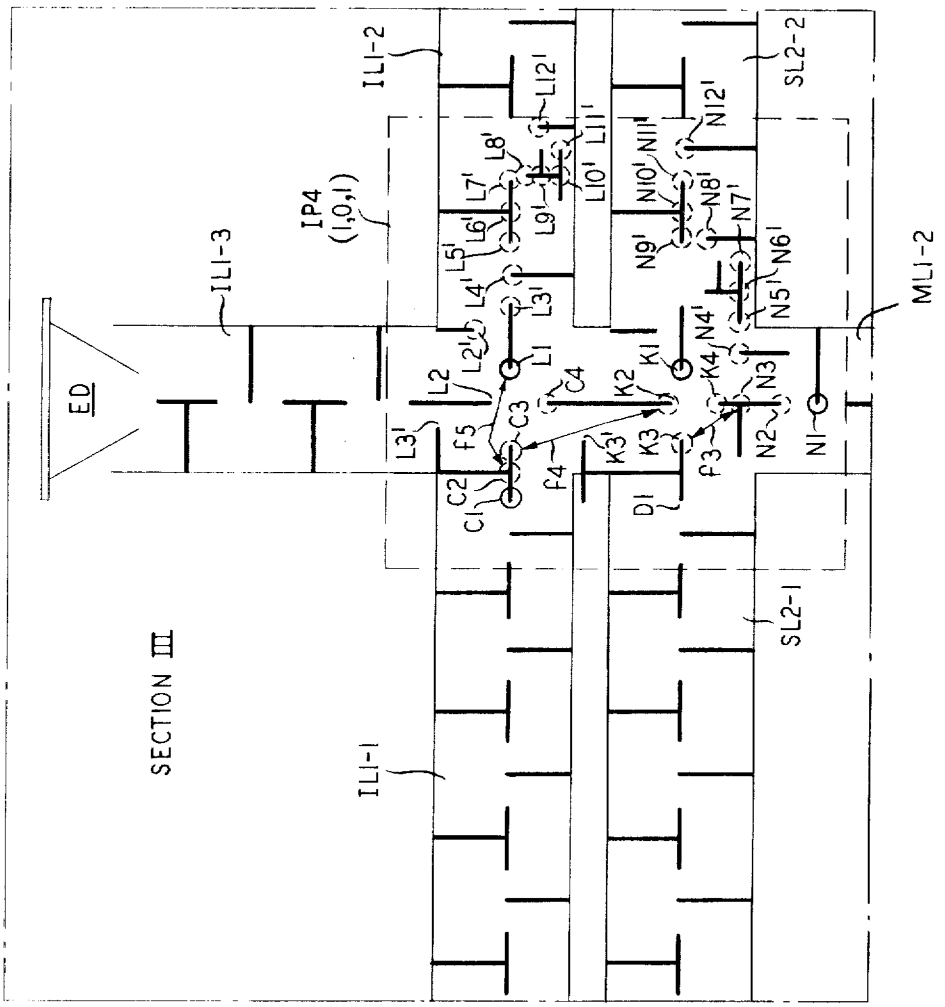

Turning now to FIG. 7, it will be recalled that when the memory contains a domain at a particular location and that location is interrogated by a vacant representation, a mismatch occurs and the memory domain continues along the channel ML1-2, FIG. 1A. A fixed number of positions thereafter, corresponding to the $y$ dimension shown in FIG. 1, the domain in memory shift register ML1-2 arrives at position N1, FIG. 7. Since a mismatch between the memory channel and the interrogate channel has been assumed, (the interrogation channel being vacant) and since domains are generated into the interrogate channel and channel SL2 concurrently, channel SL2 is vacant at the position coordinated with position N1 of channel ML1-2. In addition, since the total length of channels SL2 and SL2-1 is constructed to equal $x$ plus $y$ positions when position D1 of channel SL2-1 corresponds to position N1 of channel ML1-2. Thus, at this time position N1 contains a domain and position D1 is vacant.

Since it has been assumed that the memory will not be updated at this point, channel IL1-1 contains a domain at the coordinated position C1.

Before continuing, it should be noted that channels ML1-2 and SL2-1 form a crossover pattern having the characteristic that a domain propagated in either channel will continue straight through the intersection point. A further property of such a crossover is that when domains enter the intersection simultaneously from both channels they will each pass through the intersection without interfering with each other. The construction shown in interreaction point IP4 utilizes two crossovers which interreact with each other in the manner to be detailed hereinafter. It should also be noted that a domain, such as domain K1, is permanently trapped at the intersection between the channels. That domain, if nothing else were to happen, would continue to recirculate in a closed loop through positions K2, K3, and K4, returning to position K1 after one complete revolution of the magnetic field. Such a crossover is fully detailed in copending application Ser. No. 834,350 filed June 18, 1969 of R. H. Morrow et al now U.S. Pat. No. 3,543,255 issued Nov. 24, 1970.

Continuing now in FIG. 7, it will be seen that at the arbitrarily selected starting point domains are in positions N1, K1, L1, and C1. At the next rotation of the magnetic field domain N1 moves to position N2 and domain K1 moves to position K2. At the same time domain C1 moves to position C2. Domain L1, the trapped domain, attempts to move to its next preferred position L2 but is repelled by repulsive force *f*5 and moves instead to position L2'. This last-described action is the typical action of a crossover where the trapped domain continues along the channel and the incoming domain becomes the trapped domain.

At the next quadrant of the magnetic field, domain N2 moves to position N3 and domain C2 moves to position C3. Domain K2 then comes into the repulsive force *f*3 of domain N3 and thus attempts to move to position K3' to complete the crossover pattern. However, domain K2 is also now repulsed by force *f*4 from domain C3 and moves to its regular position K3 under the influence of domain C3. Domain N2, although under a repulsive force *f*3 from domain K3, does not have an alternate position to which it could move during this phase of the field rotation, so it moves to position N3. The domain at position L2' moves to position L3'.

At the next quadrant of the field rotation domain K3 moves to position K4. Repulsive force f3 then moves domain N3 to position N4'. Domain C3 moves to position C4 while domain L3' moves to position L4'. Domain C3 thus becomes the trapped domain at the crossover of channels IL1-1 and IL1-3.

During the next eight quadrants of the rotating field the domains in the respective channels move along the indicated positions as will be detailed hereinafter so that at the end of the twelfth quadrant a domain is in channel IL1-2 at position L12' and a domain is in channel SL2-2 at coordinated position N12'. It will be noted that channel IL1-2 contains a timing loop at positions L8' through L12'. The purpose of this loop is to delay the domain therein so as to maintain coordination between domains in the respective channels, IL1-2 and SL2-2. Thus, in situations where a mismatch occurs and the memory is not to be updated, a domain is in position L12' while a domain is in position N12'.

Figure 10:
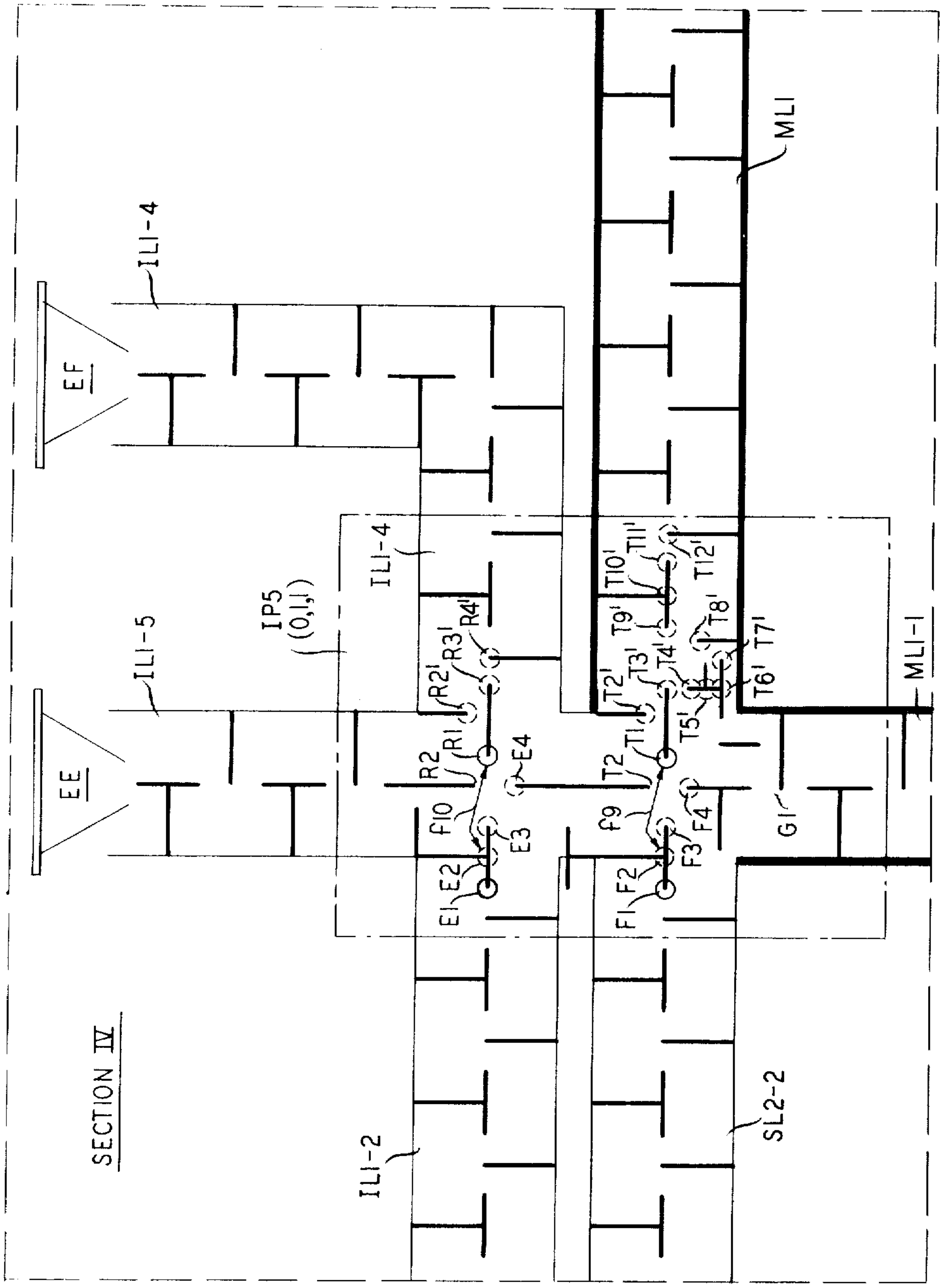

Turning now to FIG. 1, since as discussed above, a domain only enters channel ML1-1 when a domain is present in channel ML1 and is matched to a domain in channel SL1, it follows that for all mismatched conditions a vacant position occurs in the corresponding position of channel ML1-1. Channel ML1-1 is constructed to equal the number of positions $y$ in channel ML1-2 plus the number of positions $z$ in channel SL2-2. As a result of this overlay construction, respective positions of interreaction point IP5, such as positions G1 and F1, FIG. 10, are coordinated positions.

Continuing now is FIG. 10, the domain pattern described above for interreaction point IP4, FIG. 7, will now be followed down the respective channels and will be described for interreaction point IP5. Thus, position G1 is vacant when the corresponding domain is propagated to interreaction point IP5. Thus, since the domains which are coordinated with position G1 are the domains in channels SL2-2 and IL1-2 from interreaction point IP4, and since a mismatch condition is assumed, then positions E1 and F1 both contain domains. Accordingly, a domain is present in each of the positions E1, F1, R1 and T1. The domains in the latter two positions are the trapped domains at the intersection points.

In the manner discussed above, repulsive forces f10 and f9 cause the trapped domains to move down the respective channels IL1-4 and ML1 and the domains E1 and F1 then become the trapped domains. Since channel IL1-4 leads to annihilator EF, the domain therein is reduced after a number of positional movements. After the twelfth positional movement, a domain is inserted into memory channel ML1 at position T12' which position corresponds to the memory location of the previously stored domain. Accordingly, the memory ML1 remains unchanged and a domain representation corresponding to an active condition of a certain line at a certain station continues to be in the memory ML1 even though that line has now been detected as being inactive at that station.

MISMATCH CONDITION — MEMORY UPDATE

Returning now to FIG. 8, another condition which could occur at interreaction point IP4 will now be detailed. Accordingly, assume that a mismatch occurs between a domain representation (active condition) in memory and a vacant representation (inactive condition) in the interrogation channel. Then a domain representing the memory domain would be at position N1 of channel ML1-2 at the time when position C1 represents an interrogation channel SL2-1 vacancy and position D1 represents an inhibit channel IL1-1 vacancy. In this situation the crossovers function in a typical manner so that the domain at position N1 moves therethrough, into channel IL1-3 and to annihilator ED, FIG. 7.

The positional movement through the crossovers is as follows. At the third quadrant of the field domain N1 has moved to position N3 thereby forcing domain K1 to assume position K3' via force f7. Domain L1 has also been forced to assume position L3' due to force f6 now exerted by the domain in position K3'. Thus, domain N1 replaces domain K1 as the trapped domain in the lower crossover, and domain K1 in turn replaces domain L1 as the trapped domain in the upper crossover.

Domain L3', which now represents domain N1, moves toward annihilator ED, as shown in FIG. 7, and is reduced after a number of positional movements. Accordingly, after twelve field rotations, positions L12' and N12' are vacant.

Turning now to FIG. 10, positions E1 and F1, which positions correspond to the continued positional movement of positions L12' and N12', respectively, are vacant when the just described domain positions are occupied. Position G1 of channel ML1-1 must also be vacant at the coordinated time due to the assumed mismatch condition as discussed previously. Accordingly, the trapped domain remain trapped and the vacant domain position at G1 is moved one position at a time until after the 12th quadrant rotation, position T12' of memory register ML1 becomes vacant. Thus, the memory position T12' associated with the previously recorded active condition now contains a domain representation, i.e., domain vacancy corresponding to an inactive condition. Thus, the memory has been updated in accordance with the information communicated thereto from the interrogation channel.

Figure 9:
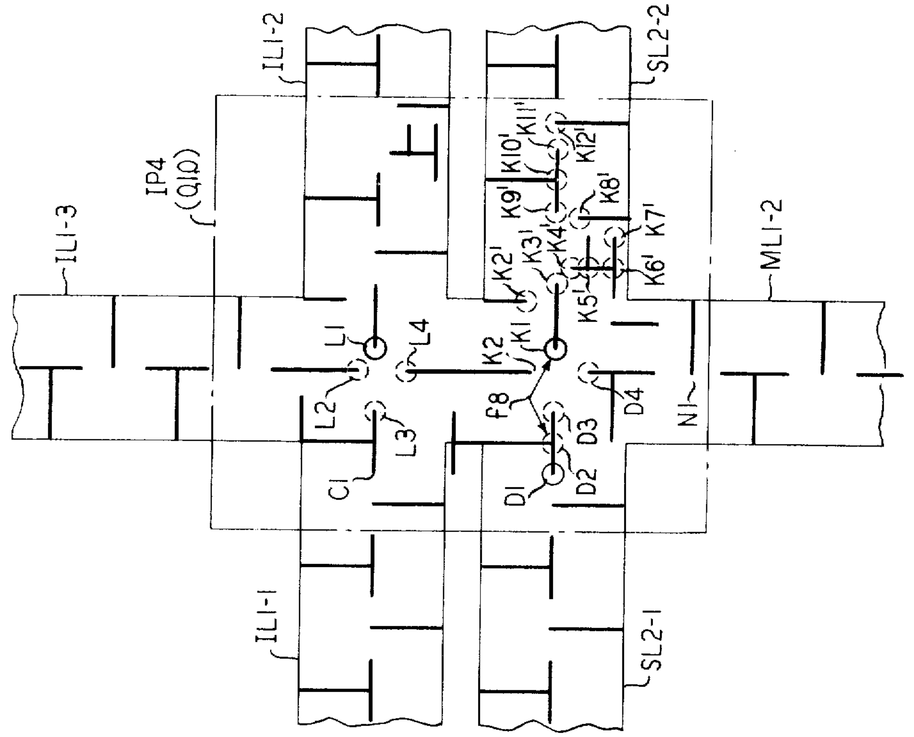
Figure 8:
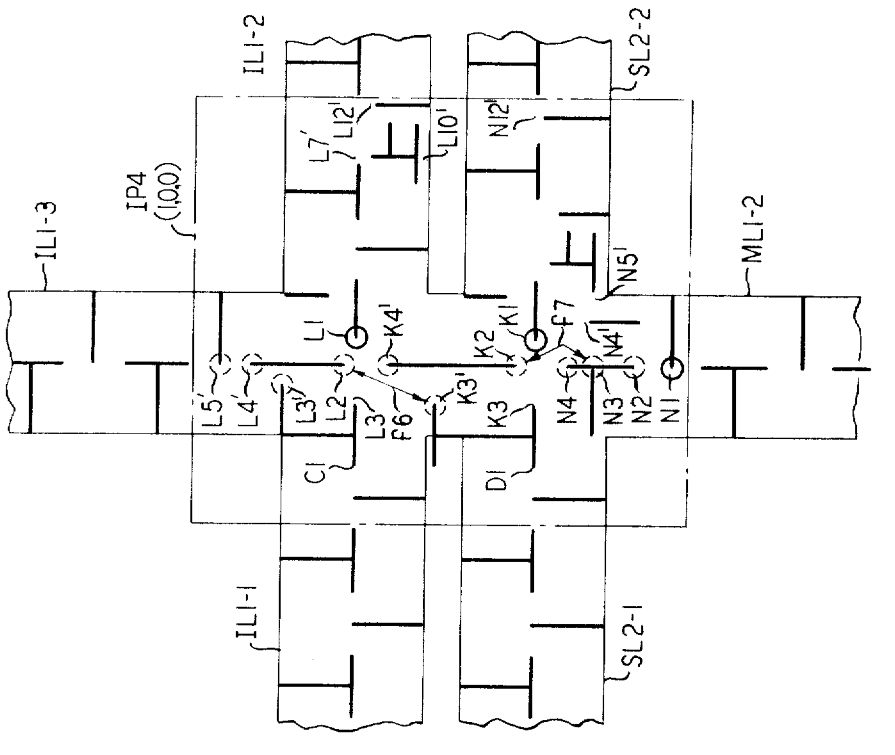

Turning now to FIG. 9, the situation where the memory contains a vacant position (inactive condition) and the corresponding interrogation point is detected active, will now be detailed. In this situation, an inactive to active mismatch occurs and position N1 of memory channel ML1-2 is vacant. Position D1 contains a domain since the memory is to be updated. This follows since channel SL2, FIG. 5, contains a domain at position H49 which domain interreacts with a domain in position J49 when the system is in the update inhibit mode. The domain in channel SL2-1 is thus removed in the manner previously discussed when the system is prepared for memory updating. Position J49 remains vacant and a domain enters channel SL2-1.

Continuing now in FIG. 9, and assuming the system to be in the memory update inhibit mode, channels ML1-2 and SL2-1 are vacant at positions N1 and D1. Twelve positional movements later position K12' becomes vacant. This follows since the auxiliary channel domain C1 moves through the crossover to channel IL1-2 in the typical manner, and the vacant positions N1 and D1 are moved through the crossover, also in the typical manner. Thus channel SL2-2 has a vacancy at position K12'. This vacant position is propagated down channel SL2-2 to interreaction point IP5, FIG. 10. Since the coordinated position G1 of memory channel ML1-1 must now also be vacant, as discussed above for a mismatch condition, after 12 field rotations position T12' in memory register ML1 is vacant. Thus, the memory remains vacant at the proper place therein even though an active condition has been detected at the corresponding line and station.

Again turning to FIG. 9, a further situation will now be detailed with respect to interreaction point IP4. Assume that the memory is to be updated in accordance with the detected data. A domain would then be present at each of the positions D1, K1 and L1. The domain at position D1 corresponds to a detected active condition. Position C1 is vacant because of the update condition and position N1 is vacant because of the vacant memory position. At the next quadrant of the field domain D1 moves to position D2. Domain K1 is then repelled to position K2'. Domain D2 then becomes the trapped domain while domain K2' continues along the channel SL2-2 and 10 field rotations later appears at position K12' as will be detailed hereinafter.

Digressing momentarily, it will be noted that the positional movement of the domain through interreaction point IP4 is critical if the domain is to remain associated with the proper memory position. Thus, assuming a starting point at position D1, FIG. 9, eleven quadrants later the domain or vacancy associated with position D1 must be at position N12'. In addition, eleven quadrants after a domain is in position N1 (the coordinated position to position D1) that domain must also be at position N12'. This fact is illustrated in FIGS. 7 and 9 where position N12' corresponds to position K12'.

It should be pointed out that due to the nature of the crossover, position K1 acts as though it was position D1. Thus, a domain at position D1 advances one full cycle (four positions) with one quadrant rotation of the field. This advancing is compensated for in the timing loop detailed in FIG. 9, which loop consists of the positions K4', K5', K6', and K7'. The overlay could be constructed such that this timing loop occurs at another point prior to position K12' and even could occur in channel SL2-1.

Returning now to FIG. 9, the domain at position K12', representing a situation where the memory was vacant and was compared to domain representation in the update mode, moves down channel SL2-2 and through interreaction point IP5, FIG. 10, in the manner illustrated. This follows since position G1 of channel ML1-1 is vacant due to the mismatch condition and thus the crossover at interreaction point IP5 functions in a typical manner. Thus a domain, as rotated from position K12', arrives at position T12' of memory loop ML1 at the proper time. Accordingly, a mismatch condition, where the memory previously contained a vacant position, has been detected and the memory updated in accordance with the data bit circulated thereto so that a domain representation of that data bit now appears in the corresponding memory location T12' of memory loop ML1.

MATCH CONDITION-MEMORY REMAINS UNCHANGED

Two situations may exist in which a match condition occurs. Either the memory channel and the interrogation channel both contain a domain in corresponding positions or they both are vacant at those positions.

In the situation where they both contain domains the domain in the memory loop ML1 will bypass the read head, FIG. 2, as discussed above and will move in channel ML1-2. Since no signal is sent to the processor a domain is generated in the auxiliary channel IL1 as discussed above. Thus, the domain in the second interrogation channel SL2 is removed therefrom as shown in FIG. 5 and as discussed above.

Figure 12:
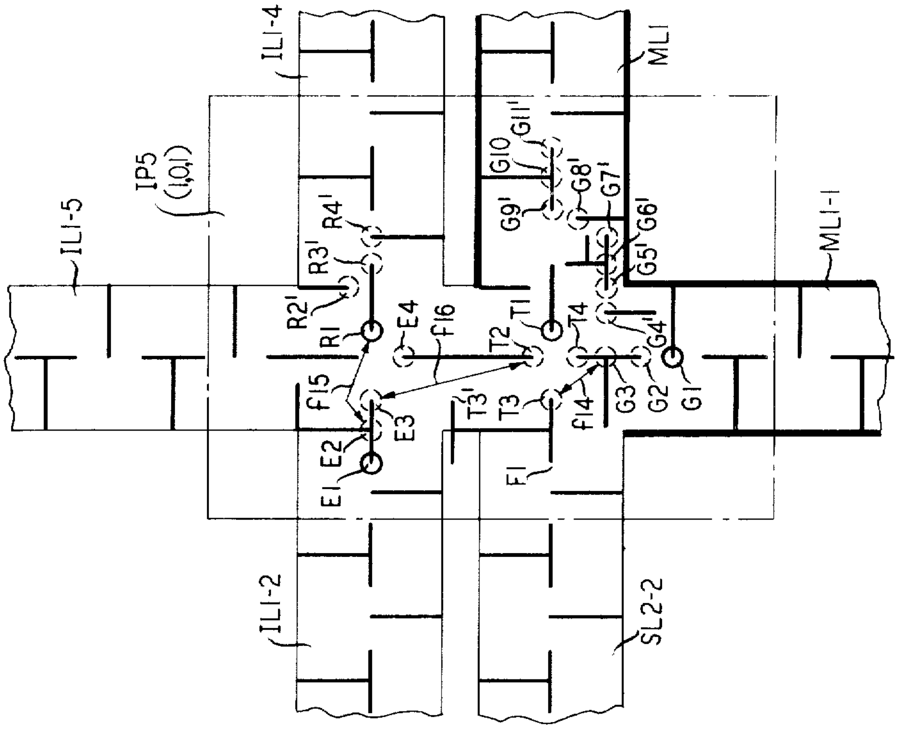

Turning now to FIG. 12, under the conditions just discussed, channel SL2-2 is vacant at position F1 and channel IL1-2 contains a domain at position E1 when the coordinated memory domain is at position G1 of memory channel ML1-1. At the next quadrant of the field domain G1 moves to position G2 and domain E1 moves to position E2. Trapped domain R1 is then forced to assume alternate position R2' under the influence of repulsive force f15. Domand T1 moves to position T2.

At the next quadrant of the field domain R2' continues down channel IL1-4 to the annihilator EF shown in FIG. 10. Domain T2 assumes position T3 due to the repulsive force f16 and domain G2 assumes position G3. At the next quadrant of the field force f14 causes domain G3 to move to position G4' while domain T3 moves to position T4. Domain G4' is then in memory channel ML1 at the proper position as discussed above and thus the memory channel, which previously had a domain therein at that location, still contains a domain at the same location.

In the second situation where both the memory and interrogate channels contain vacancies at corresponding points, a review of FIG. 12 will show that when positions F1 and G1 are both vacant, channel ML1 would remain vacant at the associated position. Thus, the memory always remains unchanged when a match condition exists between the memory representation and the interrogation representation.

Figure 11:
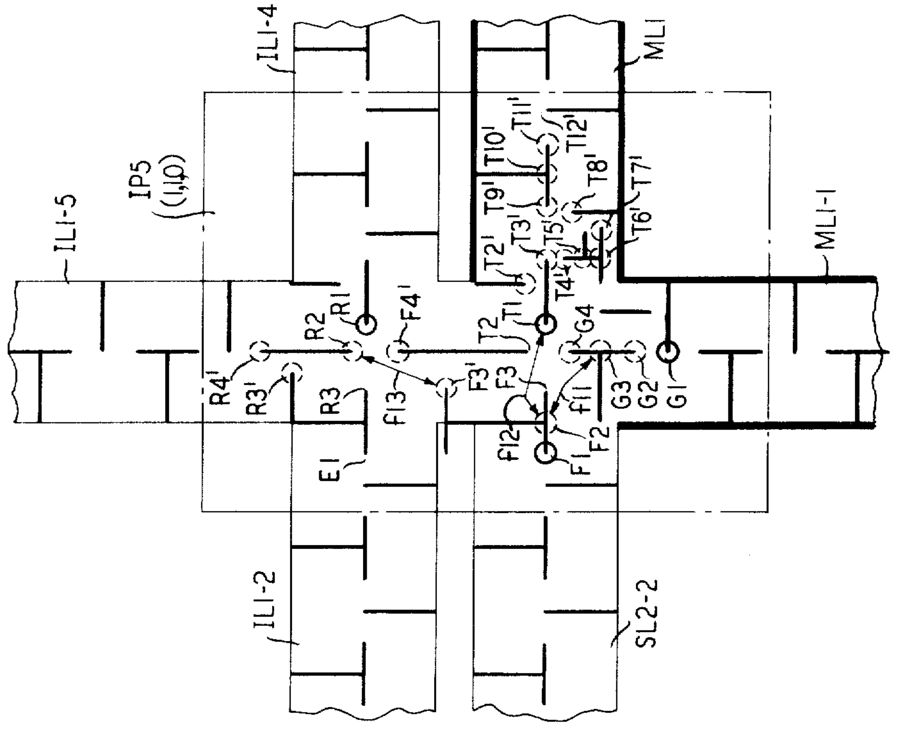

FIG. 11 illustrates a situation which cannot exist under the present embodiment but which is a situation that could occur in an arrangement wherein a memory update signal (lack of a domain in channel IL1) is always present and a domain generated only when a mismatch occurs and only when it is desired not to update the memory and only when the mismatch is active to inactive. Under this condition where a match occurs, no domain is present in the auxiliary channel IL1 so the domain in the second intersection channel SL2 remains therein. Thus, in this situation a domain is present at positions F1 of channel SL2-2 and G1 of memory channel ML1-1. These domains bypass each other at the intersection point in the manner previously discussed so that the memory channel ML1 retains a domain at the proper position T12'.

Conclusion

While the equipment of the invention has been shown in a particular embodiment wherein a plurality of shift register loops have been arranged in a magnetic domain propagation device to provide status change signals to a processor in a telephone communications environment, it is understood that such an embodiment is intended only to be illustrative of the present invention and numerous other arrangements may be devised by those skilled in the art without departing from the spirit and scope of the invention.

For example, the interrogation data bits which are compared to the memory data bits, instead of representing the busy-idle status of telephone lines, could represent the input word of a parity checking device. In such an arrangement, the memory data bits could be arranged into memory words each containing a certain number of bits and each word compared, bit by bit, against the input word. The memory word then could represent a first received word and the input word then would represent a next received word. Comparison between the words would yield a parity check on the transmission. The automatic updating feature could then revise the first received word in accordance with the next received word and at the same time transmit a mismatch signal back to the transmitting station so that the corrected information may be compared again to the retransmitted data.

What is claimed is:

1. A method for operating a memory comprising the steps of
   circulating memory data bits in sequential fashion through said memory,
   propagating interrogation data bits into physical proximity with said circulating memory data bits and in synchronous relationship therewith, and
   channeling said memory data bits and said interrogation data bits in response to the interreaction between physically proximate memory and interrogation data bits in accordance with the forces generated between synchronized memory and interrogation data bits so as to obtain an output whenever any interrogation data bit fails to match a corresponding one of said synchronized memory data bits.

2. A method for operating a memory in accordance with claim 1 wherein the step of circulating memory bits in sequential fashion through said memory comprises circulating said memory bits through a closed loop.

3. The invention set forth in claim 2 further comprising the step of
   substituting said interrogation data bits into said memory for said synchronized memory data bits.

4. The invention set forth in claim 3 wherein said substitution step includes the step of
   generating substitution data bits concurrently with said interrogation data bits and in coordinated synchronous relationship thereto.

5. The invention set forth in claim 4 further comprising the steps of
   generating inhibiting data bits in coordinated synchronous relationship with said circulating substitution data bits, and
   reducing each said coordinated substitution bit so as to prevent substitution into said memory of said coordinated substitution bit.

6. The invention set forth in claim 5 wherein said reducing step includes the steps of
   circulating respective ones of said synchronized inhibit and substitution data bits into physical proximity with each other, and
   channeling the data bits in response to the interreaction between physically proximate data bits in accordance with the forces generated between said proximate data bits.

7. A memory device wherein data bits are stored in sequential order comprising
   means for circulating said memory data bits in said memory device,
   means for generating a distinct interrogation bit for each said memory data bit,
   said circulating means including means for synchronously comparing each said generated interrogation bit with a unique one of said memory data bits for forming a mismatch representation, and
   means responsive to a said formed mismatch representation between said compared bits for providing output signals.

8. The invention set forth in claim 7 wherein said memory device comprises a sheet of material in which single wall domains can be moved, a magnetically soft overlay juxtaposed with a surface of said sheet wherein said memory data bits and said interrogation data bits comprise single wall domains moved therein.

9. The invention set forth in claim 8 wherein said means for circulating said memory data bits in said memory device includes means for circulating said memory data bits through said memory device in closed loop fashion.

10. The invention set forth in claim 9 wherein said mismatch means comprises means operable in response to an interrogation domain compared to the absence of a memory domain for providing a first signal, and means operable in response to the absence of an interrogation domain compared to a memory domain for providing a second signal.

11. The invention set forth in claim 10 wherein said mismatch means further comprises means operable in response to an interrogation domain compared to a memory domain for inhibiting said output signals.

12. The invention set forth in claim 11 wherein said inhibiting means includes means for magnetically interacting said compared domains.

13. The invention set forth in claim 7 wherein said circulating means includes means for generating substitution bits concurrently with said interrogation bits and coordinated with said memory data bits, and means for substituting said substitution bits into said memory in the place of said memory data bits synchronized therewith.

14. The invention set forth in claim 13 further comprising means for selectively inhibiting said substitution into said memory of any of said substitution bits.

15. The invention set forth in claim 14 wherein said selective inhibiting means includes means for generating auxiliary bits coordinated with said interrogation bits, means for synchronously comparing coordinated ones of said auxiliary and substitution bits, and means responsive to the interreaction between compared ones of said auxiliary and substitution bits for reducing said compared substitution bit.

16. An autonomous scanning device for use in a central processor controlled communication system for communicating information concerning status changes of any telephone station served by the system to the central processor, comprising a memory containing representations corresponding to the detected line conditions of each of said stations, means for sequentially circulating each said representation in closed loop fashion through said memory, means for sequentially communicating to said memory other representations corresponding to subsequently detected line conditions of each of said stations, means for synchronously coordinating respective line condition representations between said memory and said sequential communicating means, and means responsive to a mismatch between coordinated ones of said representations for providing a status change signal to said processor.

17. The invention set forth in claim 16 wherein said scanning device is a single wall propagation device and wherein said representations comprise single wall domains propagated therein.

18. The invention set forth in claim 16 wherein said synchronously coordinating means includes a decision point through which said representations are moved in physical proximity to each other, said decision point arranged such that respective similar representations interact to inhibit said status change signal.

19. The invention set forth in claim 18 wherein said status change indication means includes means for providing an off-hook signal when said communicated representation corresponds to an off-hook condition and said memory representation corresponds to an on-hook representation, and means for providing an on-hook signal when said communicated representation corresponds to an on-hook condition and said memory representation corresponds to an off-hook indication.

20. The invention set forth in claim 19 wherein said off-hook signal means includes means for detecting the presence at a certain location in said device of a communicated representation, and said on-hook signal means includes means in said device for detecting the presence at a certain location of a memory representation.

21. The invention set forth in claim 18 further comprising means for changing respective memory representations in accordance with said communicated representations.

22. The invention set forth in claim 21 further comprising means for selectively inhibiting said changing means.

23. The invention set forth in claim 20 wherein said inhibiting means includes means for generating representations arranged to synchronously interact with said communicated representations.

24. The invention set forth in claim 16 wherein said scanning device further comprises a plurality of closed loop memories each containing data bits circulating therethrough, a loop readout position in each said loop for providing output signals determined by the data bit associated with said readout position, said sequential circulating means operative for circulating data bits through said loops relative to said loop readout positions so that the collective outputs from all said memory loop readout positions provides data coordinated with status change signals supplied to said processor at any one time.

25. Apparatus comprising a slice of material in which single wall domains can be moved, and an overlay juxtaposed with the surface of said slice, said overlay defining a geometry of magnetic domain control channels as indicated in FIG. 1A with respective dimension as follows:

the length of channels S12 plus S12-1 being equal to the length of channels SL1 plus ML1-2, where channel SL1 has a length of $x$ domain positions and where $x$ is a positive number;

the length of channel ML1-1 being equal to the length of channels ML1-2 plus SL2-2;

the length of channel SL2-2 being equal to the length of channel IL1-2;

the length of the portion of channel ML1-2 between interreaction point IP2 and inactive read head 32 being w positions and equal to the length of the portion of channel SL1-1 between interreaction point IP2 and active read head 31; and the length of channels SL2 plus SL2-1 being greater than the length of channels IL1 plus IL1-1 by the length of channel SL1 increased by w positions.

26. A method for operating a memory comprising the steps of
circulating memory data bits in sequential fashion through said memory,
propagating interrogation data bits into physical proximity with said circulating memory data bits and in synchronous relationship therewith, and
channeling said memory data bits and said interrogation data bits in response to the interreaction between physically proximate memory and interrogation data bits.

27. A memory device wherein data bits are stored in sequential order comprising
means for circulating said memory data bits in said memory device,
means for generating a distinct interrogation bit for each said memory data bit,
said circulating means including means for synchronously comparing each said generated interrogation bit with a unique one of said memory data bits, and
means controlled by said comparing means for providing output signals.

28. A memory device comprising:
at least one memory loop for storing a plurality of memory bubbles therein;
at least one magnetic bubble detector;
at least one magnetic bubble source for supplying a control bubble to said memory loop in response to an electrical signal;
at least one information bubble source;
at least one erase means;
control means for controlling the supply of the information bubble from said information bubble source to said memory loop in accordance with the information to be stored;
eliminating means for eliminating the memory bubble by causing said memory bubble within said memory loop and the control bubble to repel each other and by sending the repelled memory bubble to said erase means;
write-in means for sending one of the control bubbles and the information bubble supplied from said control means into said memory loop by causing said control and information bubbles to repeal each other; and
readout means for sending one of the memory and control bubbles to said detector by causing magnetic interreactions between each other in accordance with the information to be read out, whereby write-in and readout of the information with respect to a desired memory loop can be attained.

29. A memory device comprising:
at least one memory loop for storing a plurality of memory bubbles therein;
first means responsive to an electrical signal and coupled to said memory loop for supplying a control bubble to said memory loop;
second means, coupled to said memory loop, for generating an information magnetic bubble;
third means, coupled to said memory loop, for erasing a magnetic bubble supplied thereto;
fourth means, coupled to said second means and said memory loop, for controlling the supply of an information bubble from said second means to said memory loop, in accordance with information to be stored;
fifth means, coupled to said memory loop, to said first means, and to said third means, for eliminating a memory bubble within said memory loop, by causing said memory bubble and said control bubble to repel each other, sending the repelled memory bubble to said third means to be erased thereby;
sixth means, coupled to said memory loop, said first means and said second means, for writing a control bubble into said memory loop by causing an information bubble and a control bubble supplied thereto to repel each other;
seventh means, coupled to said memory loop, for detecting a magnetic bubble supplied thereto; and
eighth means, coupled to said memory loop and said seventh means, for reading out the contents of said memory loop.

* * * * *

UNITED STATES PATENT OFFICE
CERTIFICATE OF CORRECTION

Patent No. 3,831,152 Dated August 20, 1974

Inventor(s) Anthony John Perneski and Robert McKee Smith

It is certified that error appears in the above-identified patent and that said Letters Patent are hereby corrected as shown below:

Column 1, line 23, change "antonomous" to --autonomous--.

Column 2, line 9, change "circulated" to --circulate--;

line 54, change "portion" to --position--.

Column 12, line 67, change "when" to --then--.

Column 15, line 13, change "domain" to --domains--.

Column 16, line 64, change "Domand" to --Domain--.

Column 22, line 2, change "repeal" to --repel--.

Signed and sealed this 19th day of November 1974.

(SEAL)
Attest:

McCOY M. GIBSON JR.
Attesting Officer

C. MARSHALL DANN
Commissioner of Patents